Aug. 21, 1934.　　　J. C. OLSEN　　　1,970,618
BELT FASTENER
Filed Feb. 15, 1933
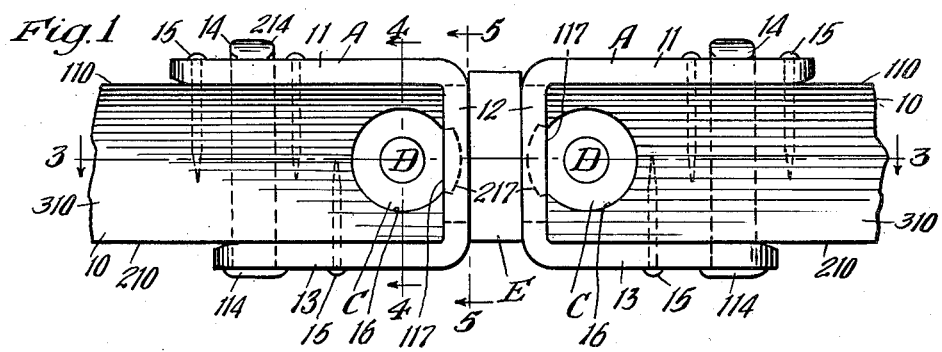
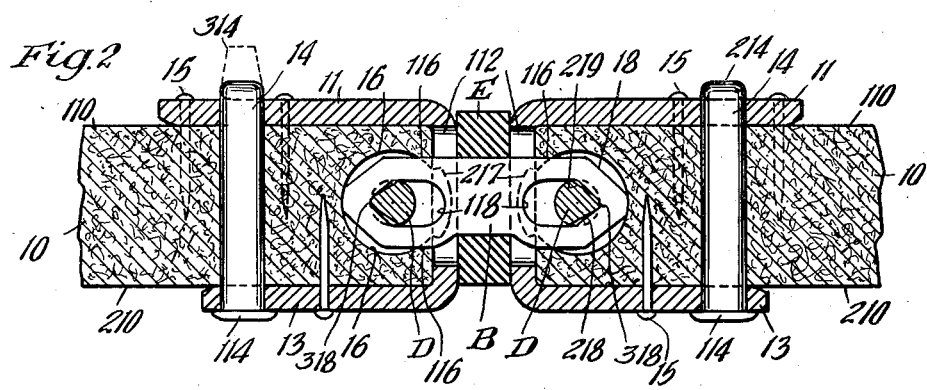
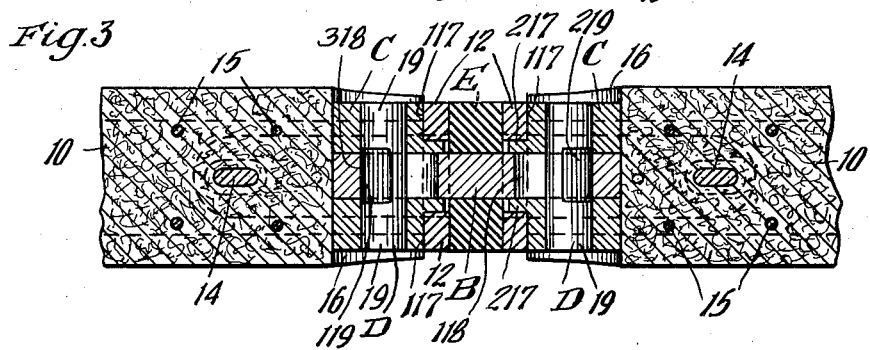
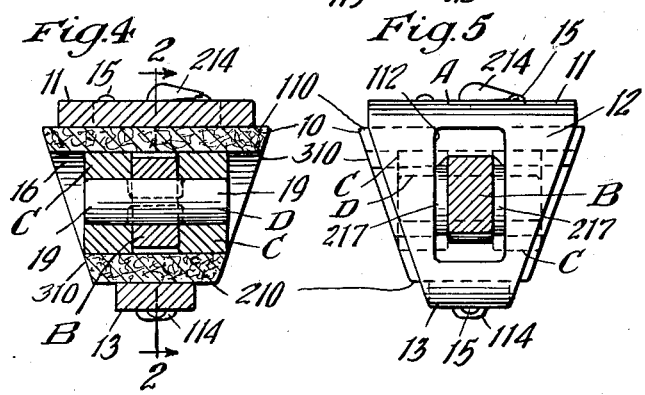 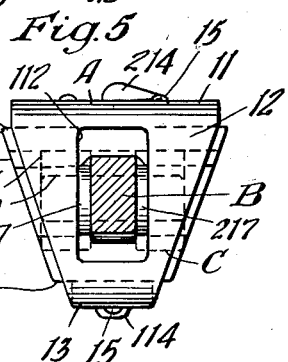 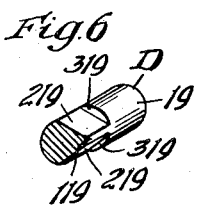
Inventor
John C. Olsen
By Joseph Harris
His Atty.

Patented Aug. 21, 1934

1,970,618

UNITED STATES PATENT OFFICE 1,970,618

BELT FASTENER

John C. Olsen, Chicago, Ill., assignor to Flexible Steel Lacing Company, Chicago, Ill., a corporation of Illinois Application February 15, 1933, Serial No. 656,891

16 Claims. (Cl. 24—31)

This invention relates to improvements in belt fastener.

In belt drives for motor generators and various other machines, it is now common practice to use what are generally known as V-belts, the use of which is constantly expanding. Said V-belts are generally comprised of fabric such as canvas and rubber or rubber composition and so molded as to provide a substantially V or wedge section to thus adapt the belts to run over grooved pulleys.

A difficulty heretofore encountered in the practical use of such V-belts, particularly where used for transmitting appreciably heavy loads and under adverse working conditions as in the case of generator drives for car lighting systems, has been to provide a satisfactory fastener for the ends of the belts. Due to the usual composition and the thick but relatively narrow cross sectional form of the V-belts, belt fasteners such as used with ordinary leather belts are neither adaptable nor satisfactory for connecting the ends of V-belts.

One object of this invention, therefore, is to provide an efficient and staunch belt fastener of the flexible or self-adjustable type for the ends of a belt and more especially, but not exclusively, for V-belts.

Another object of the invention is to provide a belt fastener, the parts of which may be ruggedly and firmly attached to the respective ends of a belt with minimization of disrupting or injuring the belt material either by the application of the fasteners, or under load, to thereby provide maximum life of service of the connection and transmission of maximum loads for belts of given size and strength.

Another object of the invention is to provide a flexible or self-adjustable type of belt fastener more especially adapted for V-belts wherein the fastener may be readily released or disconnected without necessitating removal of the attaching elements proper from the belt ends.

Still another object of the invention is to provide a belt fastener of the character indicated in the preceding paragraphs wherein the pulling stresses between the parts of the fastener are transferred to the respective belt ends at points considerably removed from the ends proper of the belt to thereby minimize any tendency for the attachments to tear or pull out under load.

A still further object of the invention is to provide a flexible or self-adjustable fastener for the ends of a V-belt such that the same may be used on belts running over pulleys of small diameters without loss of efficiency or danger of breakage.

Other objects of the invention will more clearly appear from the description and claims hereinafter following.

In the drawing forming a part of this specification, Figure 1 is a side elevational view of the adjacent ends of a belt showing the improved fastener applied thereto. Figure 2 is a vertical, longitudinal central sectional view of the construction shown in Figure 1 and corresponding substantially to the line 2—2 of Figure 4. Figure 3 is a horizontal sectional view, corresponding to the line 3—3 of Figure 1. Figures 4 and 5 are vertical, transverse sectional views corresponding to the lines 4—4 and 5—5, respectively, of Figure 1. And Figure 6 is a detailed perspective of one of the rocker pins employed, the same being shown in section at one end.

In said drawing, 10—10 denote the adjacent end portions of a V-belt which, ordinarily, will be comprised of rubber and imbedded fabric with its upper or outer face 110 appreciably wider than its lower or inner face 210 and having inwardly or downwardly converging side walls 310—310 adapting the same to run on groove pulleys.

The improved belt fastener, as shown, comprises a pair of preferably like attaching members A—A; a connecting link or a tension member B; bearing elements C—C; and rocker pins D—D. An interposed block of resilient material, such as live rubber, may also be used between the attaching members A, as indicated at E.

Each of the attaching members A, as shown, is preferably in the form of a horizontally disposed U or bail-like member, having an upper arm 11, vertical inner end section or bight 12 and lower or inner arm 13. The arms 11 and 13 are so spaced as to snugly embrace and overlie the upper and lower surfaces respectively of the belt end portion and, when employed with a V-belt, the upper arm 11 will be wider than the lower arm, as clearly shown in Figure 4, the widths being slightly less than the widths of the respective upper and lower surfaces 110 and 210 of the belt proper so as to insure clearance of the sides of the grooves of the pulleys. The arms of the members A are attached to the end portions of the belt by any suitable means but preferably by a heavy pin 14 and a plurality of smaller pins or brads 15—15. The heavy pin 14 is located as far as practically possible from the end face proper of the belt end and is entered through alined openings in the arms 11 and 13 as shown, the bottom or inner end of the pin 14 having a preferably riveted over or flattened head, as indicated at 114 and the upper end being hammered or bent over as indicated at 214 to retain the pin in place. Particular attention is directed to the cross sectional form of the pins 14 which, as shown, are relatively thin or narrow in a direction transverse to the line of the belt and relatively elongated in a direction parallel to the line of the belt with the front and rear edges rounded off, all as clearly shown in Figure 3. Preferably also, the entering ends of the pins 14 will be tapered as indicated at 314. While attaching pins of the construction described may be driven through the belt without previous formation of a hole or slit, nevertheless in actual practice, the belt will preferably be punched through with a solid punch of the same section as the pin and tapered entering end, the punch being mounted in a fixture for this purpose. By reason of the cross sectional form and rounded edges of the pins and punch, a slit will be formed in the material practically without any disruption or breaking of the belt material, the latter being only slightly crowded laterally without, however, bulging or swelling the belt in line with the pin sufficient to cause any disadvantage in operation. In this manner, there is thus afforded a very staunch connection with minimization of danger of the anchoring pin pulling out under tension loads. The additional attaching pins 15 are preferably in the form of small brads with the usual pointed and rounded shanks, the same being driven through previously prepared holes in the arms 11 and 13 and entering the belt material approximately halfway, as shown. The pins 15 will have a friction fit with the arms of the attaching member. Preferably, four such pins 15 are employed on the top or outer surface of the belt and one on the bottom. The pins 15, as will be obvious, are also of such construction as to minimize possibility of disrupting the material of the belt.

Prior to attachment of the members A, each belt end will be prepared by boring out a substantially complete cylindrical opening 16 transversely therethrough and in line with the neutral axis of the belt, as shown, said opening 16 being for the accommodation of the bearing elements C and pin D, as hereinafter described. The vertical section 12 of each member A is provided with a rectangular centrally disposed aperture 112 as best shown in Figures 2 and 5, for accommodation of the link B.

Each of the bearing elements C, of which two are used in association with each member A, preferably comprises a cylindrical sleeve or ring partially cut off to provide a flat bearing surface 117 and additionally formed with a shallow lip or flange 217 entering within and bearing against the side edge of the opening 112. The flat surfaces 117 are disposed in bearing engagement with the inner surfaces of the vertical or bight sections 112 of the members A. The bearing members C are of such dimension, axially, that they may be successively entered through the openings 112 and then shifted laterally into their proper positions, as best shown in Figure 3 and, when in position, leave sufficient space therebetween to enter the ends of the link B, as shown. With this construction, it will be observed that the bearing elements C, when in position, are prevented from rotating and all pulling loads transmitted thereto are, in turn, directly transmitted to the bight sections 12 of the corresponding members A. In actual practice also, the bearing elements C will have a snug more or less tight frictional engagement with the material of the belt.

The link B, only one of which will be preferably employed in a V-belt arrangement, is of elongated form as best shown in Figure 2, with beveled ends 18—18 and an elongated slot 118, rounded at its inner end but having converging flat surfaces 218 at the other end thereof, which, however, do not actually intersect but are united by a narrow flat bearing edge 318 to cooperate with a corresponding fulcrum edge 119 on the rocker pin, hereinafter described in detail. The link B is of such thickness as to approximately occupy the spaces between the bearing elements C when the latter are in position, as shown in Figure 3, and of such dimension vertically as to normally engage the upper and lower lips of the belt material formed by the transverse opening 16, as indicated at 116. In this manner, the resilient material of the belt normally tends to keep the link B in alinement with the center lines of the belt ends but nevertheless permits of the rocking of the link as will be understood.

Each pin D is shown as provided with cylindrical bearing ends 19—19 and an intermediate section beveled off to provide the fulcrum edge 119, previously referred to. The beveled off surfaces 219 result in the formation of opposed shoulders 319—319 which, when the parts are assembled as shown overlie the link in such manner as to prevent relative endwise movement of the pins with respect to the links. It will also be noted from inspection of Figure 2, that the angle formed between the bevel faces 219 of the rocker pins is somewhat less than the angle formed between the inclined edges 218 of the link so that the link is allowed a limited amount of pivotal or rocking movement at each end with respect to the corresponding pin D. When the rocking or flexing movement exceeds the amount allowed between the link and pins, additional rocking or pivotal movement is accommodated by the pins rotating within the respective bearing elements C, as will be understood. In actual practice, conditions may vary such that the entire flexing movement is accommodated wholly by the pins rotating in the bearing elements; by the links rocking with respect to the pins; or by a combination of both movements. The pins D are inserted after the bearing elements C and link B are in position, by first crowding the link endwise slightly into the belt material so that the pins may be entered transversely until the fulcrum sections 119—219 become seated within the link ends after which, as the belt ends are pulled apart, accidental endwise movement or removal of the pins D is prevented. Correspondingly, when it is desired to remove the pins, the reverse procedure is followed, as will be understood.

In actual practice, it is desirable under certain operating conditions, to employ a compressible block or washer of live rubber or the like, as indicated at E. Not only does this serve the purpose of assisting in maintaining all of the parts taut while allowing the necessary flexing when running over the pulleys but performs an additional function in that it closes the openings 112 of the attaching members A and snugly engages the link B, thus preventing or minimizing the entrance of dirt or other foreign matter into the belt fastener parts.

In practice, the members A will preferably be made of rolled steel; the link B and pins D of case hardened steel; and the bearing elements C of copper, although different materials may be employed, as will be obvious.

With the construction shown and described, it will be observed that the pulling strains are transmitted from the ends of the link first to the rocker pins, thence from the pins to the bearing elements and from the latter over the relatively large area flat faces 117 to the bight sections of the members A and finally from the latter to points relatively distantly located in the belt end portions. As will be apparent, the bearing elements C are normally maintained in the position shown due to their snug setting within the resilient material comprising the belt ends but, due to the resiliency of the material within which set, said elements C may shift within reasonable limits up and down on the inner faces of the bight sections of the fastening members A and thus provide what may be termed a more or less floating connection with the members A and minimize shocks to the bight sections incident to the flexing of the belt and fastener when passing over the pulleys.

Furthermore, because of the manner in which the bight sections engage the flat end faces proper of the belt and the arms embrace the belt, there is no tendency to swell or bulge the belt material or cause excessive wear thereof and the fastener, considered in its entirety, affords an exceedingly strong and durable connection capable of transmitting maximum loads for a given size belt.

Although the invention has herein been shown and described with particular reference to one form of belt and preferred embodiment of the fastener, nevertheless the same is by way of description only and not by way of limitation since, as will be apparent to those skilled in the art, various features of the invention may be adapted to other types of belts and various changes and details of construction made without departing from the spirit of the invention. All changes and modifications are contemplated that come within the scope of the claims appended hereto.

What is claimed is:

1. In a fastener for the ends of a belt, the combination with a pair of bail-like attaching members each adapted to embrace one end of the belt and with the bight thereof provided with an opening; of means for attaching the arms of said members to the belt; a link extending between and through the openings in the bights of said members; and means providing a substantially knife edge fulcrumed connection between each link end and the inner side of the bight of the corresponding member.

2. In a fastener for the ends of a belt, the combination with a pair of bail-like attaching members each adapted to embrace one end of the belt and with the bight thereof provided with an opening; of means for attaching the arms of said members to the belt; a link extending between and through the openings in the bights of said members; bearing means shiftably engaging the inner side of each bight; and a pin connection between each link end and corresponding bearing means.

3. In a fastener for the ends of a belt, the combination with a pair of bail-like attaching members each adapted to embrace one end of the belt and with the bight thereof provided with an opening; of means for attaching the arms of said members to the belt; a link extending between and through the openings in the bights of said members, said link having slots in its end portions, each formed to provide a fulcrum bearing; a pin extending through each end of the link within the corresponding bight, said pins having cooperable fulcrum bearings to provide pivot connections between the pins and link.

4. In a fastener for the ends of a belt, the combination with a pair of bail-like attaching members each adapted to embrace one end of the belt and with the bight thereof provided with an opening; of means for attaching the arms of said members to the belt; a link extending between and through openings in the bights of said members; bearing means engaging the inner side of each bight; and a pin extending through each end of the link and journaled at its ends in the corresponding bearing means.

5. A belt fastener comprising: attaching members each having an end section and upper and lower sections adapted to overlie the outer and inner surfaces of the corresponding belt ends and be secured thereto, said end sections being opposed and spaced when in place; pull-transmitting means extending from the interior of one member to the interior of the other member; and devices adjustably connecting the ends of said pull-transmitting means with the respective attaching members, said devices being detachable from said members and from said pull-transmitting means.

6. A belt fastener comprising: attaching members each having an end section and upper and lower arms adapted to overlie the outer and inner surfaces of the corresponding belt ends and be secured thereto, said end sections being opposed and spaced when in place; pull-transmitting means extending from the interior of one member to the interior of the other member; devices adjustably connecting the ends of said pull-transmitting means with the respective attaching members; and means for attaching each of said members to the belt, said means comprising a pin extending through the belt material and the arms, said pin being relatively thin in a direction transverse to the line of the belt and relatively elongated in a direction parallel to the line of the belt.

7. A belt fastener comprising: attaching members each having an end section and upper and lower sections adapted to overlie the outer and inner surfaces of the corresponding belt ends and be secured thereto, said end sections being opposed and spaced when in place; pull-transmitting means extending from the interior of one member to the interior of the other member; devices adjustably connecting the ends of said pull-transmitting means with the respective attaching members; and means encircling the pull-transmitting means and interposed between the end sections of the attaching members for sealing the parts against admission of foreign matter.

8. In a V-belt fastener, the combination with two attaching members, each having upper and lower longitudinally extending arms and a connecting end section, the upper arm being wider than the lower arm and the contour of the end section approximating the cross section of the belt and centrally apertured; means for attaching the arms to the respective belt ends; a link between said members and having its ends extending through the apertures; bearing elements seated against the inner side of each said end section; and means pivotally connecting the link ends with the bearing elements.

9. A V-belt fastener in accordance with claim 8 wherein said means include removable bearing pins.

10. In a V-belt fastener, the combination with two attaching members, each having upper and lower longitudinally extending arms and a connecting end section, the upper arm being wider than the lower arm and the contour of the end section approximating the cross section of the belt and centrally apertured; means for attaching the arms to the respective belt ends; a link between said members and having its end extending through the apertures; bearing elements seated against the inner side of each of said end sections; and a pin journaled at its ends in the bearing elements, each pin and the link having a rockable connection.

11. In a V-belt fastener, the combination with a pair of bail-like attaching members each adapted to embrace the inner and outer surfaces of the corresponding belt end and be attached thereto and with the bight thereof provided with an opening; a pair of bearing elements seated against the inner face of the bight of each said member and also seated within the belt material; a removable pin seated and journaled at its ends in each pair of bearing elements, each pin having a centrally disposed fulcrum edge; and a link extending through alined apertures in the bight sections of the members and between the respective pairs of bearing elements, the link at each end having rockable fulcrum engagement with the fulcrum section of the corresponding pin.

12. In a V-belt fastener, the combination with a pair of bail-like attaching members each adapted to embrace the inner and outer surfaces of the corresponding belt end and be attached thereto; a pair of bearing elements seated against the inner face of the bight of each said member and also seated within the belt material; a removable pin seated and journaled at its ends in each pair of bearing elements, each pin having a centrally disposed fulcrum edge; and a link extending through alined apertures in the bight sections of the members and between the respective pairs of bearing elements, the link at each end having rockable fulcrum engagement with the fulcrum section of the corresponding pin, said pins and link having shouldered engagement normally preventing endwise movement of the pins.

13. In a V-belt fastener, the combination with a pair of bail-like attaching members each adapted to embrace the inner and outer surfaces of the corresponding belt end and be attached thereto; a pair of bearing elements seated against the inner face of the bight of each said member and also seated within the belt material; a removable pin seated and journaled at its ends in each pair of bearing elements, each pin having a centrally disposed fulcrum edge; a link extending through alined apertures in the bight sections of the members and between the respective pairs of bearing elements, the link at each end having rockable fulcrum engagement with the fulcrum section of the corresponding pin, said pins and link having shouldered engagement normally preventing endwise movement of the pins; and a resilient sealing member embracing the link and interposed between the adjacent bight sections of the attaching members.

14. A belt fastener comprising: attaching members each having portions thereof adapted to embrace the outer and inner surfaces of the corresponding belt ends and be secured thereto; means flexibly connecting said attaching members; and means for attaching each of said members to its respective belt end, said means comprising a pin extending through the belt material and the embracing portions of the attaching member, said pin being relatively thin in a direction transverse to the line of the belt and relatively elongated in a direction parallel to the line of the belt, the advance edge of the pin being rounded.

15. In a fastener for the ends of a belt, the combination with a pair of bail-like attaching members each adapted to embrace one end of the belt and having its bight provided with an aperture; pull-transmitting means extended at the ends thereof through said apertures; and connecting means operatively interposed between each end of said pull-transmitting means and the inner face of the bight of the corresponding attaching member, each of said connecting means being shiftable on the inner face of its corresponding bight.

16. In a fastener of the character described, the combination with two belt ends of resilient material; of a pair of attaching members attached to the respective belt ends and each having a section disposed opposite the end face of the belt end, said sections having inner bearing faces; bearing means engaging said bearing faces, the respective belt ends being recessed to receive and normally maintain the position of said bearing means with respect to said bearing faces; and pull-transmitting means extending between and adjustably connected with the respective bearing means.

JOHN C. OLSEN.